United States Patent [19]

Haynes

[11] Patent Number: 4,493,367

[45] Date of Patent: Jan. 15, 1985

[54] REPAIR OF DOUBLE SHELL HEAT EXCHANGERS

[75] Inventor: Eugene M. Haynes, Hebron, Ohio

[73] Assignee: Owens-Corning Fiberglas Corporation, Toledo, Ohio

[21] Appl. No.: 544,927

[22] Filed: Oct. 24, 1983

Related U.S. Application Data

[62] Division of Ser. No. 237,201, Feb. 23, 1981, Pat. No. 4,430,788.

[51] Int. Cl.³ ............................................. F28F 11/00
[52] U.S. Cl. ........................................ 165/72; 165/76
[58] Field of Search .................. 165/72, 75, 71, 76, 165/78

[56] References Cited

U.S. PATENT DOCUMENTS

| 1,500,837 | 7/1924 | Moody | 165/76 X |
| 1,631,721 | 6/1927 | De Boischevalier | 165/76 |
| 2,391,876 | 1/1946 | Brown | 165/76 X |
| 4,121,656 | 10/1978 | Huber | 165/72 |
| 4,143,708 | 3/1979 | Haynes | 165/76 |

FOREIGN PATENT DOCUMENTS 572844  6/1924  France ..................... 165/76

Primary Examiner—Sheldon J. Richter
Attorney, Agent, or Firm—Ronald C. Hudgens; Patrick P. Pacella; Philip R. Cloutier

[57] ABSTRACT

A method and apparatus for sealing a hole in the inner wall of a double wall heat exchanger in which cover means is positioned in biased relationship to the hole and a frame positioned in the opening through which the cover means is inserted against the hole.

5 Claims, 4 Drawing Figures

REPAIR OF DOUBLE SHELL HEAT EXCHANGERS

This is a division of application Ser. No. 237,201 filed Feb. 23, 1981, now U.S. Pat. No. 4,430,788.

TECHNICAL FIELD

This invention relates to heat exchanger repair.

In one of its more specific aspects, this invention relates to double shell heat exchangers in which heat exchange is made between a fluid flowing within a first wall and a fluid flowing in the annular space surrounding the first wall, the annular space being defined by a second wall spaced apart from the first wall. This invention is particularly applicable to recuperators in which hot gases, such as flue gases are passed in heat exchange with the air employed in the combustion which produces the flue gases.

BACKGROUND OF THE INVENTION

Frequently, the repair of such double-shell vessels is necessitated by the corrosive properties of one of the fluids flowing therethrough, the fluid causing the occurrence of holes in the inner shell. Such corrosion has heretofore necessitated the removal of the exchanger from service in order to repair the inner shell. Employing the apparatus and method of the present invention in those instances where fluids under relatively low pressures are concerned, this invention allows repairs to be made under operating conditions with little or no loss of production.

STATEMENT OF THE INVENTION

According to the present invention, there is provided a method of repairing double shell apparatus comprising an inner shell and an outer shell having an annular space therebetween, the inner shell having an aperture therethrough in communication with the annular space, which method comprises forming an access opening in the outer shell, inserting through the access opening a rod having affixed thereto first cover means adapted to fit relatively securely over the aperture, biasing the first cover means over the aperture in substantially sealing relationship and positioning a second cover means over the access opening to close the access opening while holding the first cover means in substantially sealing relationship to the aperture.

Also, according to this invention, there is provided in a double shell apparatus comprising an inner shell and an outer shell having an annular space therebetween, the inner shell having an aperture therethrough in communication with the annular space, the improvement comprising an access opening formed in the outer shell, a rod having affixed thereto first cover means adapted to fit sustantially securely over the aperture, means adapted to bias the first cover means over the aperture and to hold the first cover means in substantially sealing relationship to the aperture, and second cover to close the access opening.

BRIEF DESCRIPTION OF THE DRAWINGS

This invention will be more easily understood if explained in conjunction with the attached drawings in which:

Referring now to FIGS. 1 and 2, there is shown heat exchanger 1 formed of inner shell 2 and outer shell 3, both shells terminated by flanges 4. Annular area 7 is positioned therebetween. Fluid access into flow area 8 of the inner shell is made by means of nozzle 5 and from area 8 by nozzle 9. Similarly, fluid access into flow area 7 on the annulus is made by means of nozzle 6 and from flow area 7 by nozzle 10 to establish counter-current flows in areas 7 and 8. It is understood, however, that parallel flow can be employed.

Figure 2:
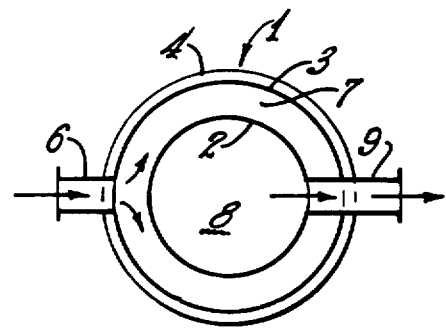
FIG. 2 is a plan view of the double-wall exchanger of FIG. 1 through Section 2—2 thereof.
Figure 1:
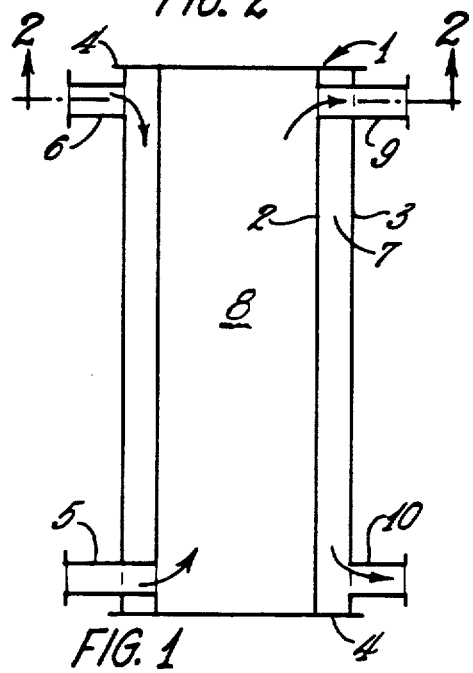
FIG. 1 depicts a view in elevation of the type of double-wall exchanger to which the invention applies.
Figure 3:
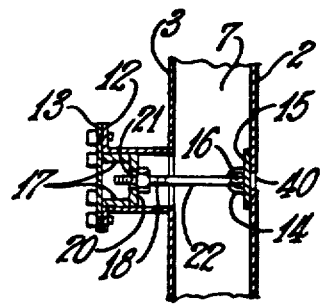
FIG. 3 is a view of the first and second cover means in place.

Assuming the occurrence of a hole 40, due to corrosion, metal failure, and the like, in wall 2, as shown in FIG. 3, the location of the hole is determined by inspection utilizing known techniques. The size of the hole is estimated and a repair member or first cover means 15 is fabricated from metal of suitable characteristics to conform to the curvature of the affected area and to cover the opening. Such metal can be any of the stainless steels, for example. A half-ring 14 is affixed to this repair member.

An access nozzle 11 is then welded to the outer shell 3, the access nozzle being adapted with flange 12, flange or second cover means 13, and frame 17. With the flange cover 13 removed, that section of shell 3 encircled by nozzle 11 is burned out to provide access to hole 40 in inner shell 2. A rod 22 of suitable diameter, for example ⅛ inch, and of suitable length is fabricated and a half-ring 16 is formed on one end of the rod in interlocking, but pivoting, relationship with half-ring 14 on the first cover means. The opposite end 18 of the rod is threaded.

A flat bar stock stop member 20 is fabricated with an oversize hole 21 being formed therein. This member is of a suitable length such that when positioned within nozzle 11, the stop member can be backed up against frame 17 and pressed, or biased, securely against the frame. The bar stock stop member is of a suitable width such that it does not completely obstruct access through nozzle 11.

A nut is threaded over the end of rod 22 and the bar stock stop member is slipped in sliding relationship up against the nut. The entire mechanism, including the first cover means is inserted through the flange and the first cover means is adjusted over the hole. The bar stock stop member is withdrawn against frame 17. By reaching in around the bar stock member, access is had to the nut which is screwed outwardly along rod 22 forcing cover means 15 in sealing relationship over hole 10 and forcing the bar stock stop member 20 firmly against frame 17 such that the rod is maintained in compression to hold the first cover member in position, with the outward end bearing on frame 17.

Any portion of rod 22 which extends outwardly and interferes with the placement of second cover means 13 when bolted to flange 12 is cut off and the second cover means 13 is bolted to the flange, thus closing the vessel.

Figure 4:
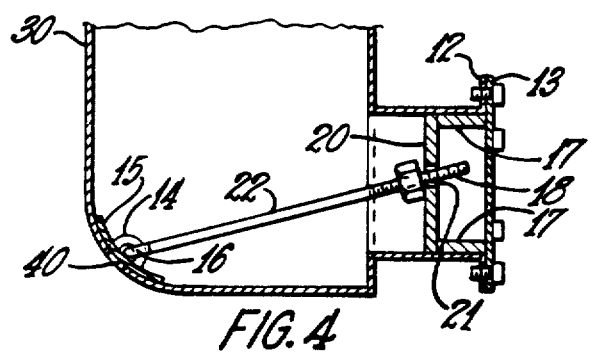
FIG. 4 is an enlarged view of the invention as applied to a curved section of inner wall.

As shown in FIG. 4, should it be necessary to repair a hole 40 in a curved portion 31 of a wall 30, then, in this instance, the above described procedure is carried out employing a curved coverage means 15.

In either case, a refractory mortar can be used in conjunction with the cover means to supplement sealing of the area to be repaired. While an absolutely positive seal might not be obtained, the pressures usually employed in such apparatus are such that leakage is substantially diminished.

It will be evident from the foregoing that various modifications can be made to this invention. Such, however, are considered within the scope of the invention.

I claim:

1. In a double shell apparatus comprising an inner shell and an outer shell with an annular space therebetween, the inner shell having an aperture therethrough, the improvement comprising an access opening in the outer shell, frame means positioned proximate said access opening, first cover means adapted to seal said aperture, said first cover means affixed to an extension means, said first cover means positioned in contact with said inner shell and said extension means being biased against said frame means, and second cover means positioned proximate said access opening.

2. The apparatus of claim 1 in which said frame means comprises a nozzle.

3. The apparatus of claim 1 in which said first cover means is movably affixed to said extension means.

4. The apparatus of claim 1 in which said extension means comprises a rod.

5. The apparatus of claim 1 in which a nut is positioned on said extension means to bias said closing means between said aperture and said frame.

* * * * *